US012812308B2

(12) United States Patent
Shiell

(10) Patent No.: US 12,812,308 B2

(45) Date of Patent: Nov. 24, 2026

(54) HEARING SYSTEM COMPRISING A NOISE REDUCTION SYSTEM

(71) Applicant: Oticon A/S, Smørum (DK)

(72) Inventor: Martha Shiell, Smørum (DK)

(73) Assignee: Oticon A/S, Smørum (DK)

( * ) Notice: Subject to any disclaimer, the term of this patent is extended or adjusted under 35 U.S.C. 154(b) by 182 days.

(21) Appl. No.: 18/608,978

(22) Filed: Mar. 19, 2024

(65) Prior Publication Data

US 2024/0334134 A1 Oct. 3, 2024

(30) Foreign Application Priority Data

Mar. 30, 2023 (EP) .................................... 23165286

(51) Int. Cl.
*H04R 25/00* (2006.01)
*G06F 3/01* (2006.01)

(52) U.S. Cl.
CPC ........... *H04R 25/505* (2013.01); *G06F 3/015* (2013.01); *H04R 25/405* (2013.01); *H04R 25/407* (2013.01); *H04R 25/552* (2013.01); *H04R 25/558* (2013.01); *H04R 25/603* (2019.05); *H04R 2225/0216* (2019.05); *H04R 2225/55* (2013.01)

(58) Field of Classification Search
None
See application file for complete search history.

(56) References Cited

U.S. PATENT DOCUMENTS

| | | | | |
|---|---|---|---|---|
| 10,362,414 | B2 | 7/2019 | Lunner et al. | |
| 2010/0074460 | A1 | 3/2010 | Marzetta | |
| 2013/0329923 | A1* | 12/2013 | Bouse | H04R 25/407 381/313 |
| 2014/0098981 | A1 | 4/2014 | Lunner et al. | |
| 2017/0180882 | A1 | 6/2017 | Lunner et al. | |
| 2018/0249245 | A1* | 8/2018 | Secall | G10L 25/93 |
| 2021/0390952 | A1* | 12/2021 | Masnadi-Shirazi | G10L 15/20 |
| 2023/0199413 | A1* | 6/2023 | Komeilipoor | A61B 5/48 381/313 |

FOREIGN PATENT DOCUMENTS

| | | | |
|---|---|---|---|
| EP | 3496417 | A2 | 6/2019 |
| EP | 4287646 | A1 | 12/2023 |

OTHER PUBLICATIONS

Miran et al., Real-Time Tracking of Selective Auditory Attention from M/EEG: A Bayesian Filtering Approach, in 12 Frontiers in Neuroscience (May 2018). (Year: 2018).*

(Continued)

*Primary Examiner* — Walter F Briney, III

(57) ABSTRACT

Disclosed herein are embodiments of a hearing system. The hearing system can include at least two input transducers for providing corresponding at least two electric input signals representing sound in an environment around the user and a beamformer filter connected to said at least two input transducers and configured to provide a spatially filtered signal comprising a target signal from a target sound source in dependence of said at least two electric input signals and adaptively updated beamformer weights. The hearing system can further include a brainwave detection system configured to provide a brainwave-based control signal.

15 Claims, 5 Drawing Sheets

(56) References Cited

OTHER PUBLICATIONS

Doclo et al., Acoustic Beamforming for Hearing Aid Applications, in Handbook on Array Processing and Sensor Networks (Hoboken, NJ, USA, John Wiley & Sons, Inc., 2019). (Year: 2019).*
Geirnaert et al.; 2021a Simon Geirnaert, Servaas Vandecappelle, Emina Alickovic, Alain de Cheveigne, Edmund Lalor, Bernd T. Meyer, Sina Miran, Tom Francart, and Alexander Bertrand, "Electroencephalography-based auditory attention decoding: Toward neurosteered hearing devices", IEEE Signal Processing Magazine 38.4 (2021): pp. 89-102.
Lotte et al.; 2018 Fabien Lotte, Laurent Bougrain, Andrze Cichocki, Mareen Clerc, Marco Congedo, Alain Rakotomamonjy, Florian Yger, "A review of classification algorithms for EEG-based brain-computer interfaces: A 10-year update", Journal of Neural Engineering 13.3 (2018): pp. 55.

* cited by examiner

HEARING SYSTEM COMPRISING A NOISE REDUCTION SYSTEM

TECHNICAL FIELD

The present applicant relates to the field of hearing devices, e.g. hearing aids. The present application relates particularly to noise reduction in a hearing device and specifically to localization (and attenuation) of an interfering signal.

In general, hearing aid users appreciate being able to hear sounds from the background around them, along with the targets of their current listening goals. The balance between target and background sounds, however, is a trade-off-hearing one of them will impair hearing of the other.

Presently, hearing aids can use directional beamforming technology to attenuate sounds in the surroundings except those that arise from directly in front of the listener. The beamforming pattern determines how much background noise is removed, and this pattern can be adjusted dynamically depending on the sound environment: More complex environments, such as a noisy canteen, require more attenuation of background noise.

There are other situations, however, in which a listener may benefit from more specific directional beamforming. For example, if a listener is focused on a target directly in front of them, there could be background noise to one side only, such as an interfering conversation happening to one side of the listener at a quiet coffee shop, or noise coming from a radio or television. In this case, the ideal would be to limit the attenuation of the background noise to the direction of its source, rather than attenuate symmetrically on both sides of the listener (in keeping with trying to preserve the representation of the full surroundings as much as possible). The present disclosure is concerned with such a situation, where the location of an interfering sound is lateralized, e.g. to either the left or the right of the target sound.

In the past decade, much research has been devoted to decoding the target of auditory attention via electroencephalography (EEG) signals. Most previous research has revolved around modelling/predicting the relationship between the temporal envelopes of the audio and the EEG activity, however this approach has questionable application because it requires the audio from the scene to be known and segregated into separate auditory tracks (reviewed in [Geirnaert et al.; 2021a]).

Some researchers have recently taken a new approach to the decoding of auditory attention from EEG, by applying standard methods to decode the location of spatial attention (cf. e.g. [Geirnaert et al.; 2021a]. Note that this is distinct from the technique mentioned above, because it does not rely on any knowledge of the sound scene, rather it asks: Which direction is the listener attending to.

It should be noted, though, that decoding the listener's location of attention may not be useful in many listening situations: It is helpful only when the listener is directing their attention somewhere other than in front of them, but listeners generally prefer to orient their heads/bodies towards the focus of their attention. Thus, decoding the location of auditory attention will not help.

SUMMARY

Rather than to detect the location of an attended target, as has been done in previously published research, the present disclosure proposes to use in-ear EEG to detect the lateralization of an interfering masker. This information may then be used to refine the direction of a beamformer of a hearing device.

The framework of the present disclosure includes at least one hearing device, e.g. a hearing aid, with the following functionality:

- In-ear EEG and its necessary components (processing unit, amplifier, electrodes, etc.),
- Connectivity from the hearing aids to a signal processing unit,
- Processing unit and algorithm(s) to
  - (1) evaluate incoming EEG information to detect if/where there is a need for lateralized suppression of a distractor, and
  - (2) send a signal to the hearing device (or to each hearing device of a binaural hearing device system) to direct the beamforming pattern.
- Algorithm for two beamformers, with lateralized attenuation respectively on the left and right sides of the listener's head.

The detection of distractor lateralization can be accomplished using standard EEG methods that are commonly applied to brain computer interfaces ([Lotte et al.; 2018]).

The solution according to the present disclosure is different from how beamformers currently adapt to the auditory scene (based on input from the microphones only), because it will help limit the attenuation of the background to only the sounds that the listener is struggling to block out. This means that the attenuation can be more aggressive, without impairing the listener's ability to hear other background sounds that might be useful. The proposed solution is distinct from previous work. The preset disclosure proposes to decode the lateralization of a distractor, whereas the published work proposes to decode the lateralization of attention.

A Hearing System:

In an aspect of the present application, a hearing system comprising at least one hearing device adapted to be worn by a user is provided by the present disclosure. The hearing system comprises

- at least two input transducers for providing corresponding at least two electric input signals representing sound in an environment around the user;
- a beamformer filter connected to said at least two input transducers and configured to provide a spatially filtered signal comprising a target signal from a target sound source in dependence of said at least two electric input signals and adaptively updated beamformer weights, the target sound source defining a target direction relative to the user;
- at least one earpiece forming part of said at least one hearing device, each earpiece comprising a housing being adapted to be located at and/or at least partially in an ear of the user;
- a brainwave detection system configured to provide a brainwave-based control signal, the brainwave detection system comprising
- a plurality of brainwave signal sensors located in and/or on said housing of said at least one earpiece, each sensor providing a brainwave signal representative of said sound in the environment around the user; and
- electric circuitry connected to said plurality of brainwave signal sensors and configured to receive and process said plurality of brainwave signals.

The electric circuitry is configured to identify a further direction to a further sound source. The further direction may be different from the target direction. The electric circuitry may be configured to identify the further direction based on one or more of the plurality of brainwave signals, and to provide the brainwave-based control signal indicative thereof. The hearing system may further be configured to determine said spatially filtered signal in dependence of said brainwave-based control signal.

Thereby an improved hearing aid system may be provided.

In other words, the hearing system may comprise a beamformer filter connected to said at least two input transducers and configured to provide a spatially filtered signal comprising a target signal from a target sound source in dependence of said at least two electric input signals, adaptively updated beamformer weights, and a target direction to/of the target sound source relative to the user.

The at least two input transducers may comprise at least one microphone, such as be constituted by microphones.

The hearing system, e.g. the hearing device (e.g. a hearing aid), may comprise a noise reduction system comprising the beamformer filter (and optionally a postfilter for further reducing noise in the spatially filtered signal from the beamformer filter).

The electric circuitry may be configured to determine the further direction as a direction of current attention of the user based on one or more of the plurality of brainwave signals.

The hearing system may comprise (or have access to) a memory containing reference brainwave data representing brainwave signals recorded while the user is instructed to suppress/ignore a distracting sound source on the left or on the right side relative to the user. The reference brainwave data stored in the memory may be accessible to the electric circuitry. The recorded reference brainwave signals may be represented by (e.g. digitized) time segments (or transformed versions thereof) of more than 5 s, e.g. more than 10 s, e.g. in range between 5 s and 20 s.

The electric circuitry may be configured to compare the reference brainwave data stored in the memory with current brainwave data representing one or more of the plurality of brainwave signals and to determine the brainwave-based control signal in dependence thereof. The electric circuitry may be configured to base the comparison on a distance measure, e.g. an Euclidian distance measure or the Least Mean Squares (LMS) algorithm, and to determine the brainwave control signal based on a criterion comprising the distance measure. The brainwave control signal may e.g. indicate that a specific further direction is detected when the criterion is fulfilled, and to indicate that no specific further direction is detected when the criterion is not fulfilled. The fulfillment of the criterion may comprise that the distance measure is smaller than a (first) threshold value. The non-fulfillment of the criterion may comprise that the distance measure is larger than or equal to a (second) threshold value. The first and second threshold values may be equal. The second threshold may be larger than the first threshold.

The electric circuitry may comprise a learning algorithm trained to determine the further direction from the plurality of brainwave signals. The electric circuitry may comprise a learning algorithm, e.g. a neural network, e.g. a convolutional neural network, or a recurrent neural network, e.g. comprising on or more gate recurrent unit (GRU) layers. The neural network may be trained to determine the further direction from the plurality of brainwave signals. The training may e.g. be based on the ('ground truth') reference brainwave data representing brainwave signals recorded while the user is instructed to suppress a distracting sound source on the left or on the right side relative to the user (e.g. while adding further (e.g. non localized) noise elements of varying type and level around the user to the acoustic distractor). Each time segment of observed (reference) brainwave data may be associated with the acoustic signal segment comprising the distractor (in different additional noise fields) that evoked the brainwave signal segment.

The hearing system may comprise a weight estimator configured to estimate the adaptively updated beamformer weights. The adaptively updated beamformer weights may represent a beamformer comprising a local minimum in the further direction. The attenuation pattern implemented by the adaptively updated beamformer pattern may be asymmetrical with respect to the target direction. Thereby signals from the further—interfering—sound source are attenuated compared to signals from other directions around the user. The further (interfering) sound source may originate from a competing speaker (different from the target sound source (that typically originates from a current communication partner or a currently preferred speaker).

The hearing system may comprise a speech detector for estimating whether or not, or with what probability, an input signal comprises speech at a given point in time and providing a speech activity control signal indicative thereof. The hearing system may further be configured to determine the spatially filtered signal in dependence of the speech activity control signal. The hearing system may be configured to determine an attenuation of sound from the further direction in dependence of the speech activity control signal. The weight estimator may be configured to determine the adaptively updated beamformer weights representing a beamformer comprising a local minimum in the further direction so that the depth of the local minimum depends on the speech activity control signal. The depth may be deeper in case speech is dominant compared to a case where noise is dominant.

The target direction may be a look direction of the user. A look direction of the user may be defined by the direction reflected by the direction of the nose of the user. A look direction of the user may be defined by a direction of the nose of the user modified by an angle defined by an eye gaze deviating from 0°. An eye gaze of 0° may indicate that the user looks in the direction defined by the nose. An eye gaze different from 0° may indicate that the user's eyes focus on an object in a direction different from the direction defined by the nose, e.g. at an angle of +15°. A normal eye gaze range of a human being, e.g. the user, may be represented by angles $\varphi$ (see $\varphi_1, \ldots, \varphi_J$ in FIG. 2A) between −60° and +60°, e.g. between −30° and +30°, around a normal front-looking direction defined by the nose of the user.

The further direction may be in a left or right half plane relative to the user. The further direction may be in a left or right half plane relative to the user, the left and right half planes being defined relative to (i.e. separated by a line along) the look direction of the user (cf. e.g. FIG. 2B). The further direction may be in an angular range (e.g. +/−20°) around a left (−90°) or right (+90°) direction relative to the user.

The at least one earpiece may comprise the at least two input transducers. The hearing system may comprise first and second hearing devices comprising first and second earpieces, respectively. The first and second earpieces may each comprise at least one of said at least two input transducers.

The hearing system may comprise at least one output transducer providing stimuli to the user in dependence of the spatially filtered signal or on a further processed version thereof. The at least one output transducer may be located in the at least one earpiece. The at least one output transducer may comprise a loudspeaker.

The hearing system may comprise an external signal processor separate from and in communication with the at least one earpiece. The external signal processor and the at least one earpiece may comprise appropriate antenna and transceiver circuitry allowing a wireless link to be established between them. The external signal processor and the at least one earpiece may be connected to each other via an electric cable or an optic link.

The brainwave signal sensors may be constituted by or comprise electric potential sensors. A brainwave signal sensor may comprise an electrode adapted to pick up electric potentials from the user's brain when the electrode is in contact with human skin or tissue in or at an ear of the user.

The hearing system may comprise first and second hearing devices adapted to be worn by a user at and/or at least partially in left and right ears, respectively, of the user. The first and second hearing devices may be configured to exchange data between them. The first and second hearing devices may comprise antenna and transceiver circuitry allowing a wireless communication link to be established between them, either directly or via the external signal processor. The first and second hearing devices may be connected to each other via an electric cable or an optic link. The first and second hearing devices may comprise respective first and second earpieces. The first and second earpieces may comprise the antenna and transceiver circuitry. The first and second earpieces may each comprise at least one of the at least two input transducers. The first and second earpieces may each comprise at least one or said at least one output transducer. The first and second earpieces may each comprise at least two input transducers.

A current direction to a source of an interference signal to the target signal of the hearing device may be estimated based on monaural data in each of the left and a right hearing device. This may have the advantage of avoiding the transfer of potentials (or voltages) from one hearing device to the other (i.e. to avoid using a direct electrical cable or a wireless link between the left and right ears). The results of the two monaurally determined estimates may be exchanged between the hearing devices, and an average or other combination of the two estimates may be determined and used for control of processing algorithms in each of the left and right hearing devices.

The hearing system may be constituted by or comprise an air-conduction type hearing aid.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output transducer may comprise a receiver (loudspeaker) for providing the stimulus as an acoustic signal to the user (e.g. in an acoustic (air conduction based) hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, e.g. Bluetooth LE Audio (or functionally similar technology)), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, such as less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a recurrent neural network, e.g. a trained neural network.

The hearing aid may further comprise other relevant functionality for the application in question, e.g. compression, acoustic (and/or mechanical) feedback control (e.g. suppression) or echo-cancellation, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers (e.g. a microphone array) and a number of output transducers, e.g. one or more loudspeakers, and one or more audio (and possibly video) transmitters e.g. for use in an audio conference situation), e.g. comprising a beamformer filtering unit, e.g. providing multiple beamforming capabilities.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, or audio delivery) systems, teleconferencing systems, classroom amplification systems, etc.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing system comprising at least one hearing device adapted to be worn by a user is provided by the present disclosure. The hearing system comprises at least two input transducers for providing corresponding at least two electric input signals representing sound in an environment around the user;

at least one earpiece forming part of said at least one hearing device, each earpiece comprising a housing being adapted to be located at and/or at least partially in an ear of the user;

a beamformer filter connected to said at least two input transducers and wherein the beamformer filter is configured to provide a spatially filtered signal comprising a target signal from a target sound source in dependence of said at least two electric input signals and adaptively updated beamformer weights, the target sound source defining a target direction relative to the user;

a brainwave detection system configured to provide a brainwave-based control signal, the brainwave detection system comprising a plurality of brainwave signal sensors located in and/or on said housing of said at least one earpiece, each sensor providing a brainwave signal representative of said sound in the environment around the user; and electric circuitry connected to said plurality of brainwave signal sensors and configured to receive and process said plurality of brainwave signals.

The method comprises identifying a further direction to a further sound source, said further direction being different from said target direction, based on one or more of said plurality of brainwave signals, and to provide said brainwave-based control signal indicative thereof, and determining said spatially filtered signal in dependence of said brainwave-based control signal.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise estimating whether or not, or with what probability, one or more of the at least two electric input signal comprises speech at a given point in time and providing a speech activity control signal indicative thereof;

determine the spatially filtered signal further in dependence of the speech activity control signal.

The method may comprise attenuating signals from the further direction further in dependence of the speech activity control signal.

The method may comprise comparing reference brainwave data representing brainwave signals recorded while the user is instructed to suppress a distracting sound source on the left or on the right side relative to the user with current brainwave data representing one or more of the plurality of brainwave signals and to determine the brainwave-based control signal in dependence thereof.

The reference brainwave data may be stored in memory accessible to the electric circuitry during normal use of the hearing system.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Further Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth (e.g. Bluetooth LE Audio) or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC, a wireless microphone, etc.) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in applications such as hearing aids, headset and earphones.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
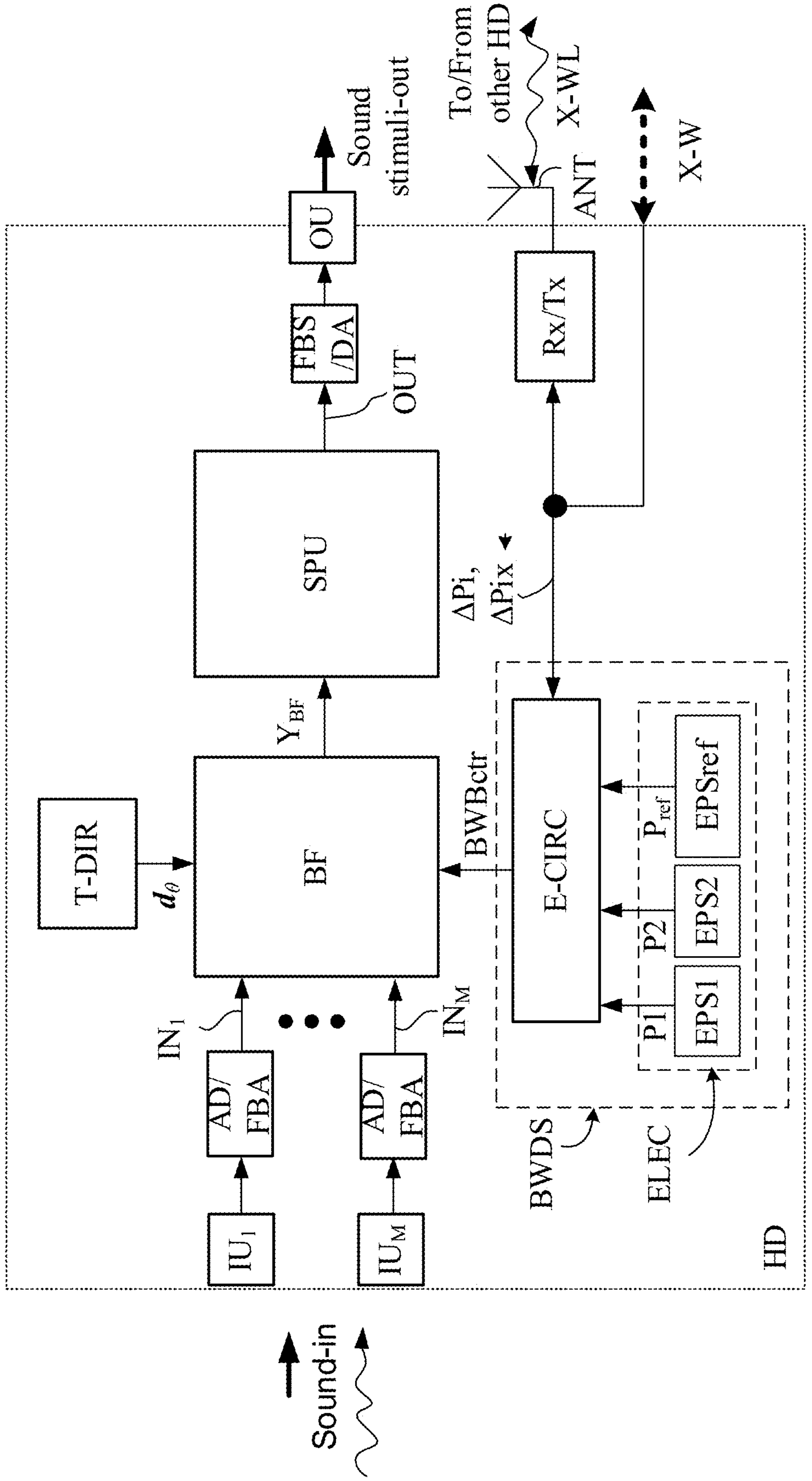
FIG. 1 shows a first embodiment of a hearing device according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as “elements”). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present applicant relates to the field of hearing systems, e.g. hearing devices, such as hearing aids or headsets. The present application relates particularly to noise reduction in a hearing device and specifically to localization (and attenuation) of an interfering signal.

The haring system may be configured to provide the following functionality:

1. The hearing device records and preprocesses in-ear brainwave (e.g. EEG) activity at one or both ears.
2. The brainwave detection system (e.g. comprising a processor) for detection of distractor lateralization applies an algorithm to match whether the listener’s EEG pattern of activity matches the patterns that are known for situations where the listener is trying to suppress a distractor on the left or on the right.
3. If either of the above situations are detected, the processor sends a signal to the HA to adapt its beamforming pattern to either attenuate more on the left or right, as detected.

FIG. 1 shows an embodiment of a hearing device or system comprising at least one earpiece according to the present disclosure. The hearing device, e.g. a hearing aid, (HD) comprises a forward path from a number M of input units ($IU_1, \ldots, IU_M$) for picking up sound or receiving electric signals representing sound (‘Sound-in’) to an output unit (OU) for providing stimuli (‘Sound stimuli-out’) representing said sound and perceivable as sound by a user wearing the hearing device. The forward path further comprises a number M of analogue to digital converters (AD) and analysis filter banks (FBA) operationally coupled to each their input unit ($IU_1, \ldots, IU_M$) and providing respective digitized electric input signals $IN_1, \ldots, IN_M$ in a time-frequency representation, each comprising a number K of frequency sub-band signals $IN_1(k,m), \ldots. IN_M(k,m)$, k and m being frequency and time indices, respectively, $k=1, \ldots, K$. The forward path further comprises a noise reduction system (NRS) (comprising a beamformer filter) receiving the electric input signals ($IN_1, \ldots, IN_M$) as inputs and providing a resulting (spatially filtered, noise reduced) signal ($Y_{NR}$) as a weighted combination of the M electric input signals. In other words, $Y_{NR}=f\{IN_1(k,m)*w_1(k,m), \ldots. IN_M(k,m)*w_M(k,m)\}$, where $w_i$. $i=1 \ldots, M$, are real or complex (in general, time and frequency dependent) weights, an f is a function allowing for a further noise duction after the beamformer filter). The forward path further comprises a signal processor (SPU) for further processing the resulting (noise reduced) signal ($Y_{NR}$) and providing a processed signal OUT. The signal processor (SPU) is e.g. configured to apply a level and/or frequency dependent gain or attenuation according to a user’s needs (e.g. hearing impairment). The forward path further comprises a synthesis filter bank (FBS) for converting frequency sub-band signals OUT to a single time-domain signal, and optionally a digital to analogue conversion unit (DA) to convert the digital processed time-domain signal to an analogue electric output signal to the output unit (OU). The output unit (OU) may comprise an output transducer. The output transducer may comprise a receiver (loudspeaker) for providing the stimulus as an acoustic signal to the user (e.g. in an acoustic (air conduction based) hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing device or system (HD) comprises a brainwave detection system (BWDS) for capturing brainwave signals representative of sound in the environment around the user. The brainwave detection system (BWDS) comprises a sensor unit (ELEC) comprising a plurality of brainwave signal sensors, e.g. electrical potential sensors (EPSi), for sensing an electrical potential (Pi) from the body (e.g. the head, such as the brain) of the user (here i=1, 2), in particular from the head, e.g. due to brain activity or muscular movement. The electrical potential sensors, e.g. electrodes, are located in or on the at least one earpiece, each providing a brainwave signal (potentials, or voltages P1, P2, Pref). The sensor part may comprise a reference sensor electrode (EPSref) for providing a reference potential (Pref) to which each potential (Pi) is referenced. The electrical potential sensor (EPSx) may e.g. comprise an electrode configured to contact skin or tissue of the user’s head, when the electric potential sensor part (e.g. the hearing device, such as the earpiece(s)) is operationally mounted on the user (e.g. in an ear canal) or implanted in the head of the user. The hearing device or system (HD) further comprises electric circuitry (E-CIRC) configured to receive and process said plurality of brain wave signals (P1, P2, Pref). The electric circuitry (E-CIRC) further comprises amplifier and processing parts, to provide one or more amplified EEG signals. The amplifier, e.g. comprising a differential buffer, e.g. a differential amplifier and/or an analogue to digital converter, may receive potentials P1, P2, $P_{ref}$ from electric potential sensors (EPS1, EPS2, EPSref) of the hearing device and voltage differences relative to a reference potential (ΔPix, i=1, 2) provided by the electric circuitry (E-CIRC) based on the potentials P1, P2, $P_{ref}$ and optionally received from a corresponding contralateral hearing device. The voltage differences (ΔPix) may be received either via wireless link X-WL (cf. antenna and transceiver circuitry (ANT, Rx/Tx)) or via wired connection X-W. The reference potential $P_{ref}$ originate from a reference electrode (EPSref), either located in the hearing device or elsewhere on or in the head of the user. Potential differences (ΔPi, i=1, 2) representing locally captured potentials relative to the reference potential $P_{ref}$ may be transmitted to the contralateral hearing device (and corresponding voltage differences may be received from the contralateral hearing device of a binaural hearing device system).

The electric circuitry (E-CIRC) is configured to identify a direction to a further sound source (apart from a target sound source), such direction being different from the target direction. The identification of the further direction is based on one or more of the plurality of brain wave signals. Based thereon, the electric circuitry (E-CIRC) provides a brainwave-based control signal (BWBctr) indicative of the further direction. The noise reduction system (NRS) (e.g. a beamformer filter or a postfilter) is further configured to determine the noise reduced signal ($Y_{NR}$) in dependence of the brainwave-based control signal (BWBctr). This further configuration will result in an asymmetrical (with reference to the user's head) beamforming pattern that directs its maximum noise reduction towards the interfering sound. As such, it is not equivalent to merely changing the weights of the beamformer (i.e. narrowing a beam that targets a frontal direction). This configuration change may be accomplished by changing the directionality of a standard (e.g. MVDR, e.g. implemented as a generalized sidelobe canceller (GSC)) beamforming algorithm. It may alternately be accomplished by summing the signals from the input transducers with time shifts that reduce signals from the direction of the interferer. The brainwave detection system (e.g. the electric circuitry, and the plurality of brainwave signal sensors) may be configured to capture electroencephalography (EEG) signals from the brain, cf. e.g. US2010196861A1 or US2014098981A1.

The hearing device (or each of the hearing devices of a binaural system) (e.g. the sensor unit (ELEC)) may comprise at least two electrical potential sensors (EPS1, EPS2), each providing a potential (P1, P2) representing a brainwave potential. The E-CIRC may support processing to filter, transform, and reduce the brainwave signals. The E-CIRC may also include memory to store the most recent processed brainwave signals, for e.g. up to 10 seconds. The BWBctr signal will be determined by comparing the processed brainwave signal over time to a hard-coded reference signal. The hard-coded reference signal may be developed in advance from brainwave potential data recorded from listeners when their attention is manipulated in a controlled environment. This development may follow established methods for determining the location of a listener's attention, but modified so that they decode the location of an interfering sound source rather than an attended sound source. A current direction to a source of an interference signal to the target signal of the hearing device may be estimated based on monaural data (from the at least two sensors in the same hearing device) in each of a left and a right hearing device. This may have the advantage of avoiding the transfer of potentials (or voltages) from one hearing device to the other (i.e. to avoid a direct electrical cable or a wireless link between the left and right ears). In case a connection between the two hearing devices exists, the results of the two monaurally determined estimates may be exchanged between the hearing devices, and an average or other combination of the two estimates may be determined and used for control of processing algorithms in each of the hearing devices.

At least one (such as all) of the input units may comprise an input transducer, e.g. a microphone. At least one (such as all) of the input units may comprise a wireless transceiver, e.g. a wireless receiver, e.g. configured to receive a signal representative of sound picked up by a remote (wireless) microphone.

The hearing device may comprise a head tracker. The hearing device may comprise an accelerometer and/or a gyroscope. The hearing device may comprise a 9 degree of freedom sensor, comprising a 3D accelerometer, a 3D gyroscope, and a 3D magnetometer.

The hearing device may comprise a wireless transceiver and appropriate antenna circuitry (ANT, Rx/Tx) allowing the mentioned reception of electric potentials (Pix) (or voltage differences (ΔPix) referring the potentials to a reference) from and transmission of such signals (Pi, ΔPi) to a contra-lateral hearing device via a wireless link (X-WL) or wired connection (X-W), cf. waved and dotted straight, arrowed lines denoted 'To/From other HD' in FIG. 1. The electric potential differences (ΔPix) from the contra-lateral hearing device are fed to the electric circuitry (E-CIRC) (comprising amplifier and processing capabilities) and may be compared to the corresponding locally generated potentials (P1, P2). A resulting brainwave-based control signal (BWBctr) based on binaural information may thereby be provided.

Figure 2A:
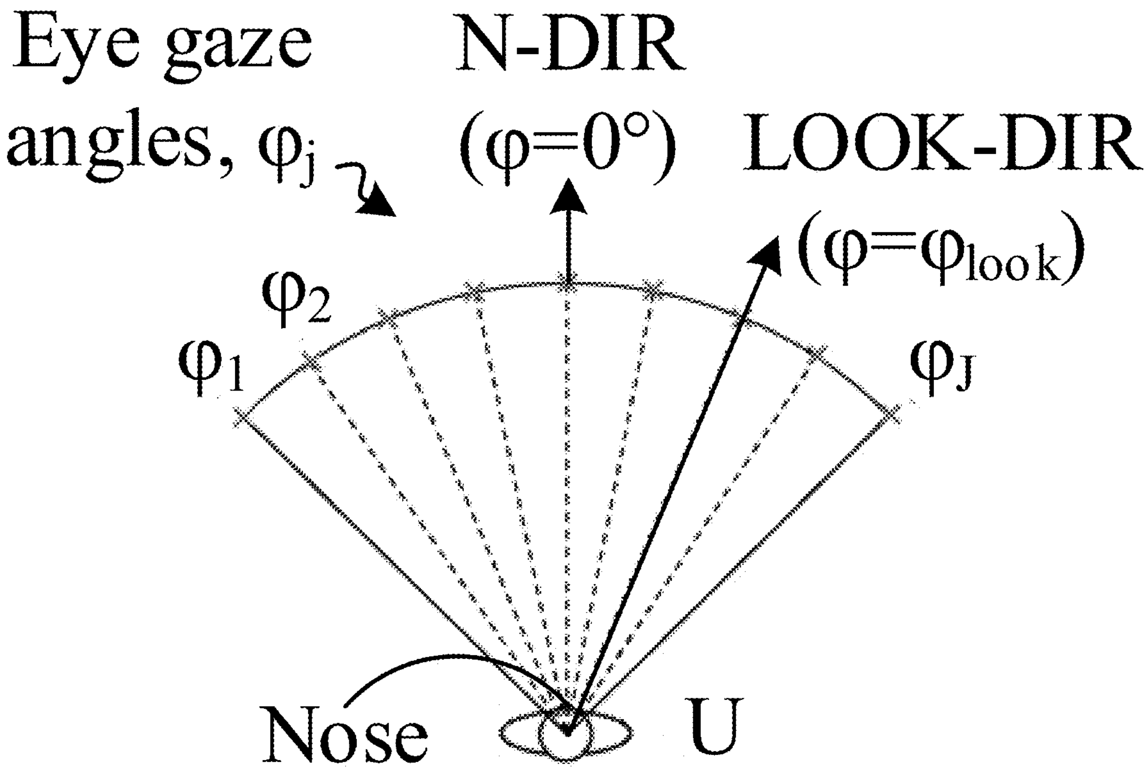
FIG. 2A shows an example of a users' candidate eye-gaze directions $\varphi_j(n)$, j=1, . . . , J, at time n, whereby the user's direction of attention (i.e. the target direction, assumed to be the look direction) may deviate from the direction defined by the user's nose.
Figure 2B:
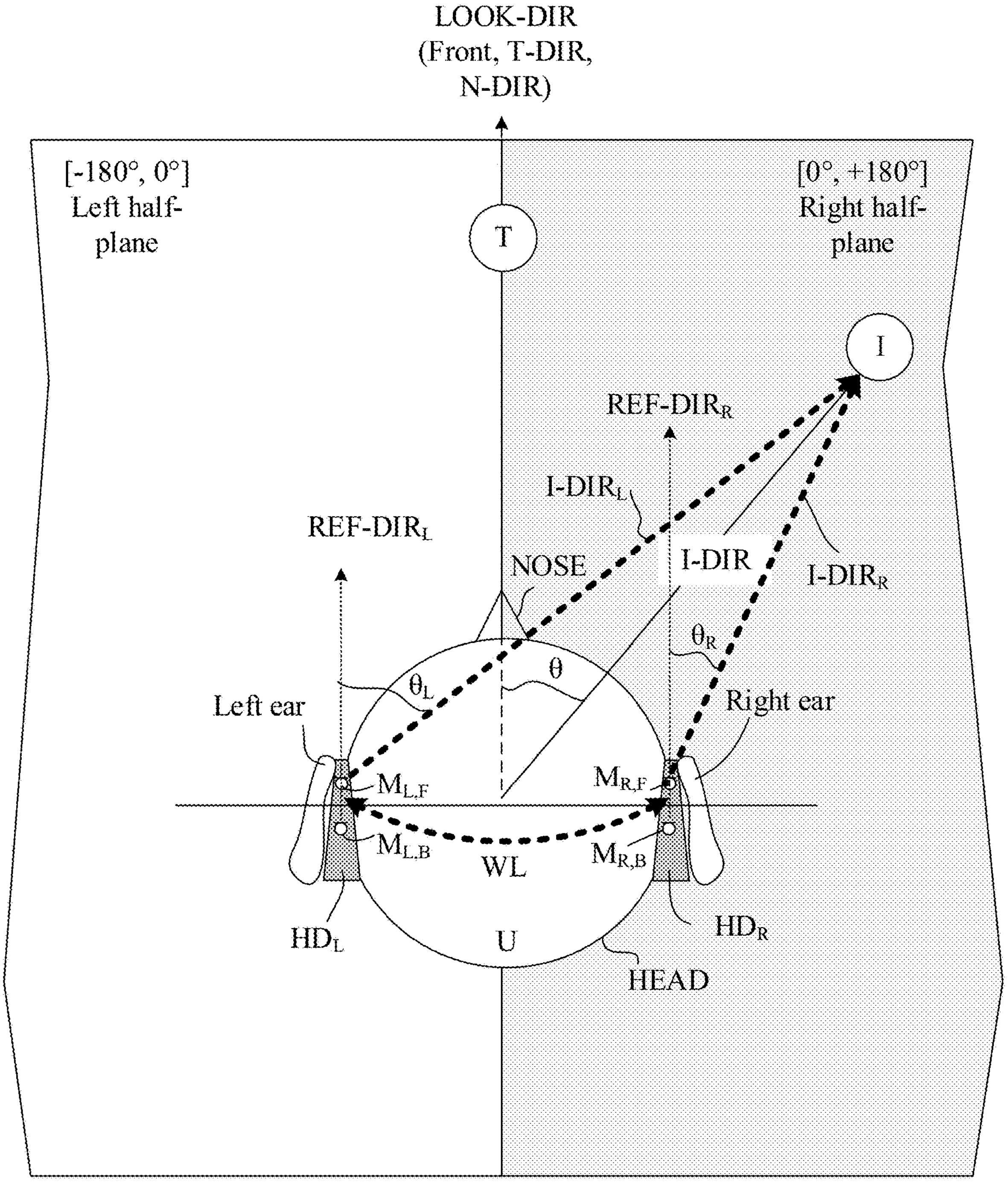
FIG. 2B shows an example of the location of the target sound source and the location of a further (interfering) sound source and the corresponding target direction and further direction from a given hearing device to the sound source in question.

A look direction (LOOK-DIR) of the user may be defined by the direction reflected by the direction of the nose of the user (as shown in FIG. 2B). A look direction of the user may be defined by a direction of the nose of the user modified by an angle (φ) defined by an eye gaze deviating from 0°. This is illustrated in FIG. 2A.

FIG. 2A shows an example of a users' (U) candidate eye-gaze directions $\varphi_j(n)$, j=1, . . . , J, at time n, whereby the user's direction of attention (i.e. the target direction (T-DIR), assumed to be the look direction (LOOK-DIR)) may deviate from the nose direction (N-DIR) defined by the user's nose (Nose). An eye gaze of φ=0° may indicate that the user looks in the direction defined by the nose (LOOK-DIR=N-DIR, cf. FIG. 2B). An eye gaze different from φ=0° may indicate that the user's eyes focus on an object in a direction different from the direction defined by the nose (i.e. LOOK-DIR=0°+φ(n)), e.g. at an angle of φ=+30° (cf. $\varphi=\varphi_{look}$ in FIG. 2A). A normal eye gaze range of a human being, e.g. the user, may be represented by angles φ (see $\varphi_1, \ldots, \varphi_J$ in FIG. 2A) between −60° and +60°, e.g. between −30° and +30°, around a normal front-looking direction (N-DIR) defined by the nose of the user.

FIG. 2A schematically illustrates a number of predefined eye-gaze angles reflecting the (limited) angle range available for a human being (e.g. a user (U) of the hearing device). In the following it is assumed that $\varphi_j(n)$ represents the users' eye gaze angle in the horizontal plane with respect to the frontal direction (cf. 'Front' in FIG. 2B) as a function of time, n. For simplicity, it is assumed that the eye-gaze angle at a particular moment in time is one out of J possible angles, $\phi(n)=\{\phi_1(n), \ldots, \phi_J(n)\}$. In other words, a dictionary of candidate eye-gaze angles is defined. In FIG. 2A, an example ($1 \leq j \leq 9$) of a set of candidate eye-gaze directions is depicted, where each cross indicates a direction in which the eye-gaze may be. In practice, to obtain the eye-gaze signal, one or multiple peripheral sensors, are assumed accessible, for example camera(s) mounted on glasses pointing towards the user's eyes, EEG or EOG signals from head-mounted electrodes, etc. (cf. e.g. US2014098981A1 US20170180882A1, or our co-pending European patent application no. 22176296.6 with the title 'A hearing aid system comprising a sound source localization estimator', filed with the European Patent Office on 31 May 2022). The eye gaze angles may be provided in a discrete form (as in FIG. 2A) or in a continuous form.

FIG. 2B shows an example of the location of the target sound source (T) and the location of a further (interfering) sound source (I) and the corresponding target direction (T-DIR) and further direction (I-DIR; $I\text{-}DIR_L$; $I\text{-}DIR_R$) from a given hearing device ($HD_L$; $HD_R$) to the sound source in question.

FIG. 2B shows an exemplary geometric setup of a binaural hearing system comprising left and right hearing devices ($HD_L$; $HD_R$) adapted to be worn by a user at and/or at least partially in left and right ears (Left ear; Right ear), respectively, of the user (U). The left and right hearing devices ($HD_L$; $HD_R$) are configured to exchange data between them via a wireless link (cf. WL, dashed double arrow between the hearing devices), e.g. provided by appropriate antenna and transceiver circuitry. The left and right hearing devices may comprise respective first and second earpieces. The first and second hearing devices each comprises at least one input transducer ($M_L$; $M_R$), here shown as two (Front- and Back-) microphones ($M_{L,F}$, $M_{L,B}$; $M_{R,F}$, $M_{R,B}$) in each hearing left and right devices ($HD_L$; $HD_R$), respectively. The two microphones may e.g. be located in respective BTE-parts adapted for being located at or behind the outer ear (pinna) of the user (U). The two microphones ($M_{L,F}$, $M_{L,B}$; $M_{R,F}$, $M_{R,B}$) define respective microphone axes ($REF\text{-}DIR_L$, $REF\text{-}DIR_R$) as axes through the centres of the respective microphone pairs. When the hearing devices are mounted as intended at the ears of the user, the microphone axes are both located in a horizontal plane and are both parallel to the direction defined by the nose (NOSE) of the user (U). The first and second hearing devices, e.g. respective earpieces thereof, may each comprise an output transducer (cf. OU of FIG. 1, and SPK of FIG. 3), e.g. a loudspeaker for playing processed versions of sound signals picked up by the microphones ($M_{L,F}$, $M_{L,B}$; $M_{R,F}$, $M_{R,B}$) of the left and right hearing devices.

The target direction (T-DIR) is the direction from a target sound source (T) relative to the hearing devices. The target sound source (T) will typically be a source of speech, e.g. from a communication partner, that the user intends to listen to. The target direction is exemplified (in FIG. 2B) as the front direction (Front) and here assumed to be the look direction (LOOK-DIR) of the user (U).

The direction (I-DIR) of the further (interfering) sound source (I), e.g. relative to the hearing device(s) ($HD_L$; $HD_R$) (e.g. to the microphone system or microphone ($M_L$, $M_R$)) is symbolically indicated by symbol θ (a common angle (θ) from the centre of the head (HEAD) of the user (U)) or (an individual angle ($\theta_L$, $\theta_R$) for each hearing device ($HD_L$; $HD_R$)) relative to the direction (N-DIR) defined by the nose (NOSE) of the user (U). The interfering sound source (I) may e.g. be a source of speech from a competing speaker that the user does not want to listen to. The interfering sound source (I) may, however, comprise any localized sound source that is not located in a target direction (T-DIR).

The directions (T-DIR, I-DIR) are shown in FIG. 2B as angles in a horizontal plane, e.g. a horizontal plane through the ears of the person or user (when the person or user is in an upright position). The directions may be located in other horizontal planes, or be out of plane (when the directional system is appropriately modified).

In the geometrical setup of the binaural hearing system shown in FIG. 2B the further direction (I) is located in a right half plane (denoted [0°, +180°], "Right half-plane') relative to the user (U). The further direction (I) may alternatively be located in a left half plane (denoted [−180°, 0°], "Left half-plane') relative to the user (U). The left and right half planes may be defined relative to (i.e. separated by) the look direction of the user (cf. e.g. FIG. 2A or FIG. 2B).

Figure 3:
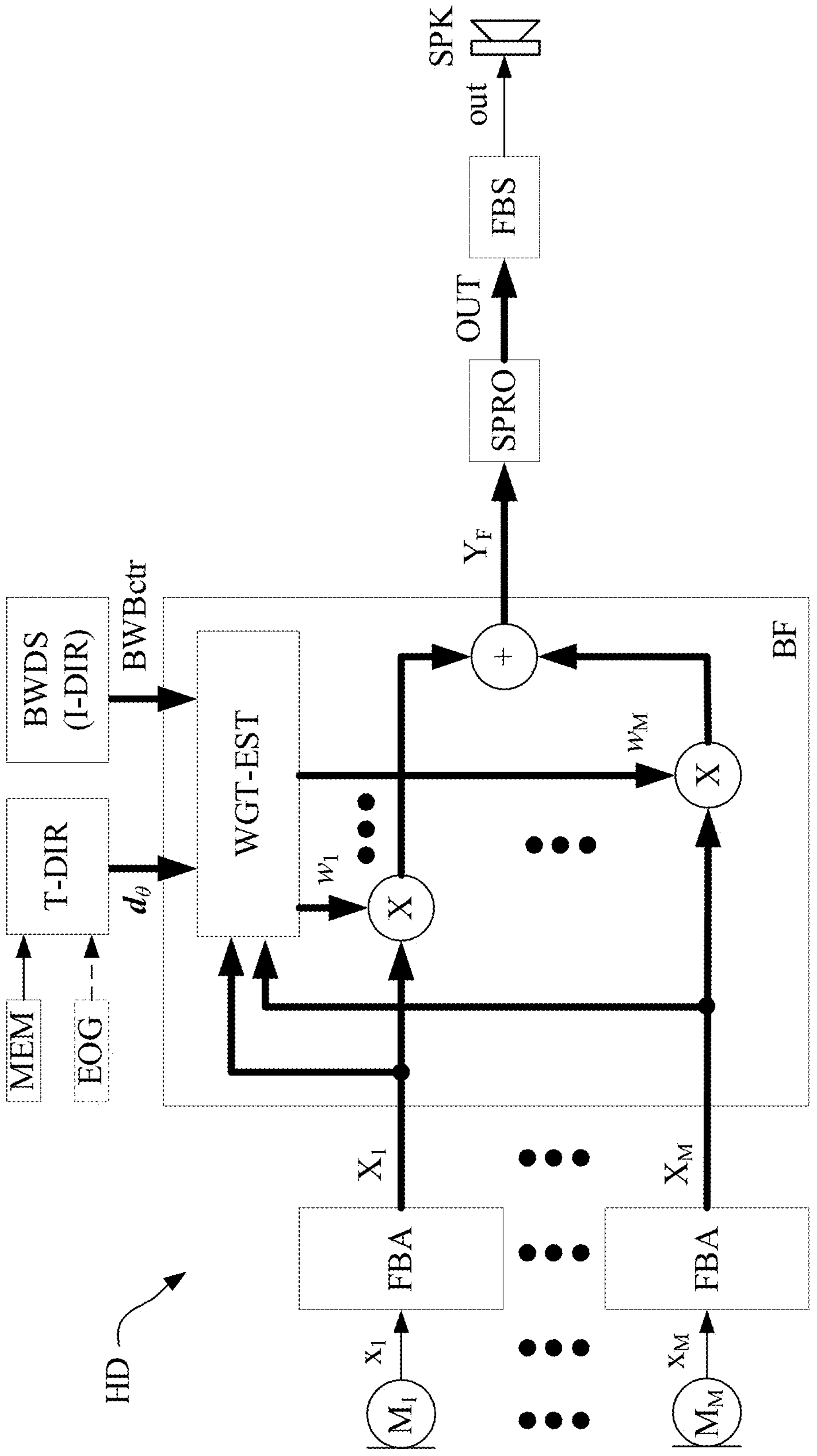
FIG. 3 shows a second embodiment of a hearing device according to the present disclosure.

FIG. 3 shows a second embodiment of a hearing device according to the present disclosure. FIG. 3 shows a hearing device (HD) adapted to be worn by a user similar to the embodiment pf FIG. 1. The hearing device (HD) of FIG. 3 comprises a multitude (M) of microphones ($M_1, \ldots, M_M$) for providing a corresponding multitude of (time-domain) electric input signals ($x_1, \ldots, x_M$) representing sound in an environment around the user. Each microphone path comprises an analysis filter bank (FBA) configured to provide each of the multitude (M) of (time-domain) electric input signals ($x_1, \ldots, x_M$) as frequency sub-band signals ($X_1, \ldots, X_M$) in a time-frequency representation (k, l), where k and l are frequency and time indices, respectively. The hearing device (HD) further comprises a beamformer filter (BF) connected to said multitude (M) of microphones ($M_1, \ldots, M_M$). The beamformer filter (BF) is configured to provide a spatially filtered signal ($Y_F$) comprising a target signal from a target sound source in dependence of the multitude of frequency sub-band signals ($X_1, \ldots, X_M$) and adaptively updated beamformer weights ($w_m$, m=1 ..., M). The target sound source defines a target direction (T-DIR, see FIG. 2A, 2B) relative to the user (U). The hearing device (HD) further comprises an earpiece comprising a housing (cf. e.g. 'Housing' in FIG. 4A, 4B). The housing is adapted to be located at and/or at least partially (e.g. fully) in an ear of the user.

As in the embodiment of FIG. 1, the hearing device (HD) of FIG. 3 further comprises a brainwave detection system (BWDS (I-DIR)) configured to provide one or more brainwave signals representative of sound in the environment around the user and configured to provide a brainwave-based control signal (BWBctr) indicative of a further direction (I-DIR) to a further (interfering) sound source, where the further direction is different from the target direction, and where the brainwave-based control signal (BWBctr) is based on one or more (such as all) of the plurality of brainwave signals.

The hearing device (e.g. the beamformer filter (BF)) is configured to determine the spatially filtered signal ($Y_F$) comprising a target signal from a target direction (T-DIR) in dependence of the brainwave-based control signal (BWBctr) in addition to its dependence on the multitude of frequency sub-band signals ($X_1, \ldots, X_M$) and adaptively updated beamformer weights ($w_m$, m=1, ..., M).

The hearing device (e.g. the beamformer filter (BF) of FIG. 3) comprises a weight estimator (WGT-EST) configured to estimate the adaptively updated beamformer weights (wm, m=1, . . . , M), wherein the adaptively updated beamformer weights represent a beamformer comprising a local minimum in the further direction (I-DIR). The weight estimator (WGT-EST) is configured to estimate the adaptively updated beamformer weights (wm, m=1, . . . , M) in dependence of a) the time-frequency version of the electric input signals ($X_1, \ldots, X_M$), b) the direction (T-DIR) to the target sound source (T) (cf. signal $d_\theta$ from the T-DIR-block), and c) the direction(s) (I-DIR) to an interfering (localized) sound source (I), if present (cf. signal BWBctr from the brainwave detection system (BWDS)). The attenuation pattern implemented by the adaptively updated beamformer pattern may be asymmetrical with respect to the target direction (T-DIR). Thereby signals from the further—interfering—sound source (I) are attenuated compared to signals from other directions around the user (including from the target direction). The further (interfering) sound source (I) may originate from a competing speaker (different from the target sound source; the target sound source (T) may originate from a current communication partner or another speaker currently preferred by the user).

As illustrated in the embodiment of FIG. 1, the brainwave detection system (BWDS (I-DIR)) comprises electric circuitry (E-CIRC) configured to determine which direction(s) (I-DIR) the listener is currently attending to (in addition to the target direction (T-DIR)) based on the plurality of brainwave signals. The brainwave detection system (BWDS (I-DIR)), e.g. the electric circuitry (E-CIRC) may comprise memory containing reference brainwave data representing brainwave signals recorded while the user is instructed to suppress a distracting sound source (I) on the left or on the right side relative to the user (cf. e.g. FIG. 2B). The reference brainwave data stored in the memory may be made accessible to the brainwave detection system (BWDS (I-DIR)), e.g. the electric circuitry, during normal use of the hearing device. The recorded (and stored) reference brainwave signals may be represented by (e.g. digitized) time segments (or transformed versions thereof) of an appropriate duration with respect to characteristic features of the brainwave signals invoked by audio signals presented to the user via the hearing device(s). The brainwave detection system (BWDS (I-DIR)), e.g. the electric circuitry, is configured to compare the reference brainwave data stored in the memory with current brainwave data representing one or more of the plurality of brainwave signals and to determine the brainwave-based control signal (BWBctr) in dependence thereof. The brainwave detection system (BWDS (I-DIR)), e.g. the electric circuitry, may be configured to base the comparison on a distance measure, and to determine the brainwave control signal based on a criterion comprising the distance measure.

The brainwave detection system (BWDS (I-DIR)), e.g. the electric circuitry, may comprise a learning algorithm trained to determine the further direction (I) from the plurality of brainwave signals. The learning algorithm may be an alternative to described comparison of stored (pre-recorded) reference brainwave signals with current brainwave signals during use of the hearing device. The pre-recorded reference brainwave signals (and their associated directions to interfering sound sources) may be used as ground truth data for training the learning algorithm, e.g. a neural network, e.g. a convolutional neural network, or a recurrent neural network, e.g. comprising on or more gated recurrent unit (GRU) layers. Optimized parameters resulting from training of the learning algorithm may be stored in memory of the hearing aid in advance of its use.

The hearing device, e.g. the weight estimator (WGT-EST) or the block T-DIR in FIG. 3, may comprise a speech detector for estimating whether or not, or with what probability, an input signal comprises speech at a given point in time and providing a speech activity control signal indicative thereof. The hearing system may be configured to determine the spatially filtered signal ($Y_F$) in dependence of the speech activity control signal. The hearing device, e.g. the weight estimator (WGT-EST), may be configured to determine an attenuation of sound from the further direction (I-DIR) in dependence of the speech activity control signal. The weight estimator (WGT-EST) may be configured to determine the adaptively updated beamformer weights ($w_m$) representing a beamformer comprising a local minimum in the further direction (I-DIR) so that the depth of the local minimum depends on the speech activity control signal. The depth may be deeper in case speech is dominant compared to a case where noise is dominant.

The hearing device, e.g. the block T-DIR of FIG. 3, may be configured to associate the target direction (T-DIR) with a current look direction of the user. A look direction of the user may be defined by the direction reflected by the direction of the nose of the user (cf. e.g. FIG. 2B). A look direction of the user may be defined by a direction of the nose of the user modified by an angle defined by an eye gaze deviating from 0° (cf. e.g. FIG. 2A).

Figure 4A:
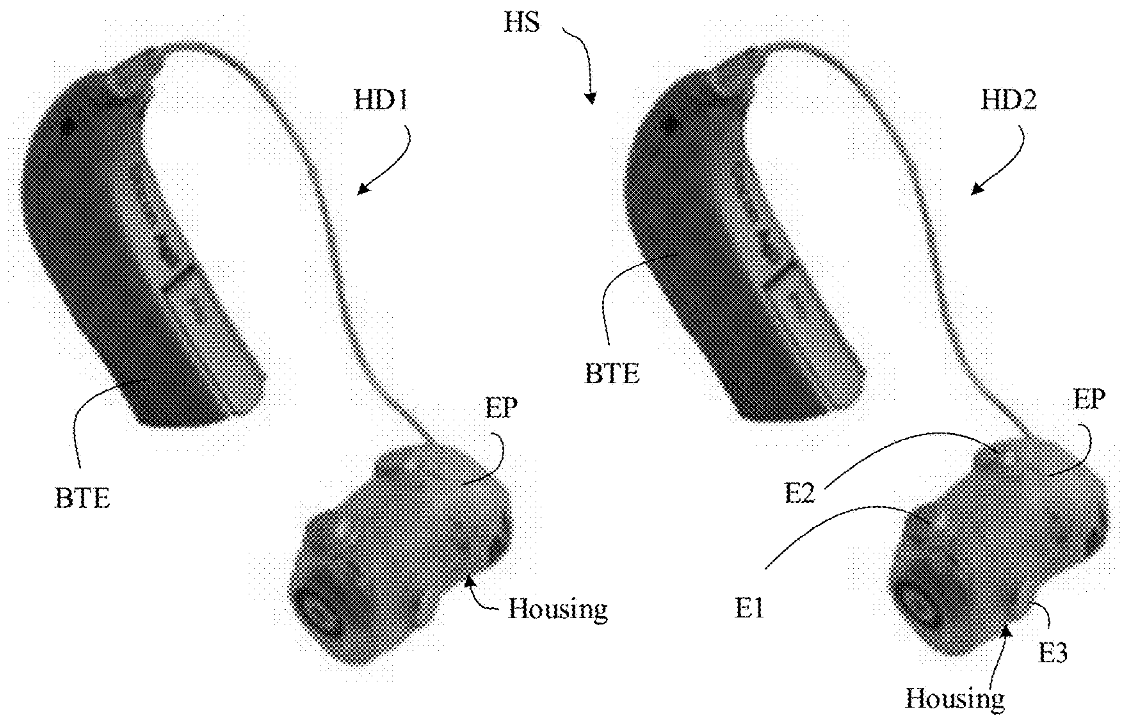
FIG. 4A shows a pair of behind the ear (BTE) hearing devices comprising electrodes on a mould surface of an ITE part.

FIG. 4A shows a hearing system (HS) comprising pair of behind the ear (BTE) hearing devices (HD1, HD2) comprising electrodes on a mould surface of an ITE part (earpiece, EP) (cf. EP3496417A2). The embodiment of FIG. 4A shows electrodes (E1, E2, E3) located on the surface (Housing) of (customized) in-the-ear moulds (EP), but may also be applied to more general purpose domes or ITE-parts, or may be integrated in a behind the ear part (BTE). In an embodiment, the electrodes are 'conventional (dry or wet) electrodes' for establishing a direct electric contact between skin and electrode.

Figure 4B:
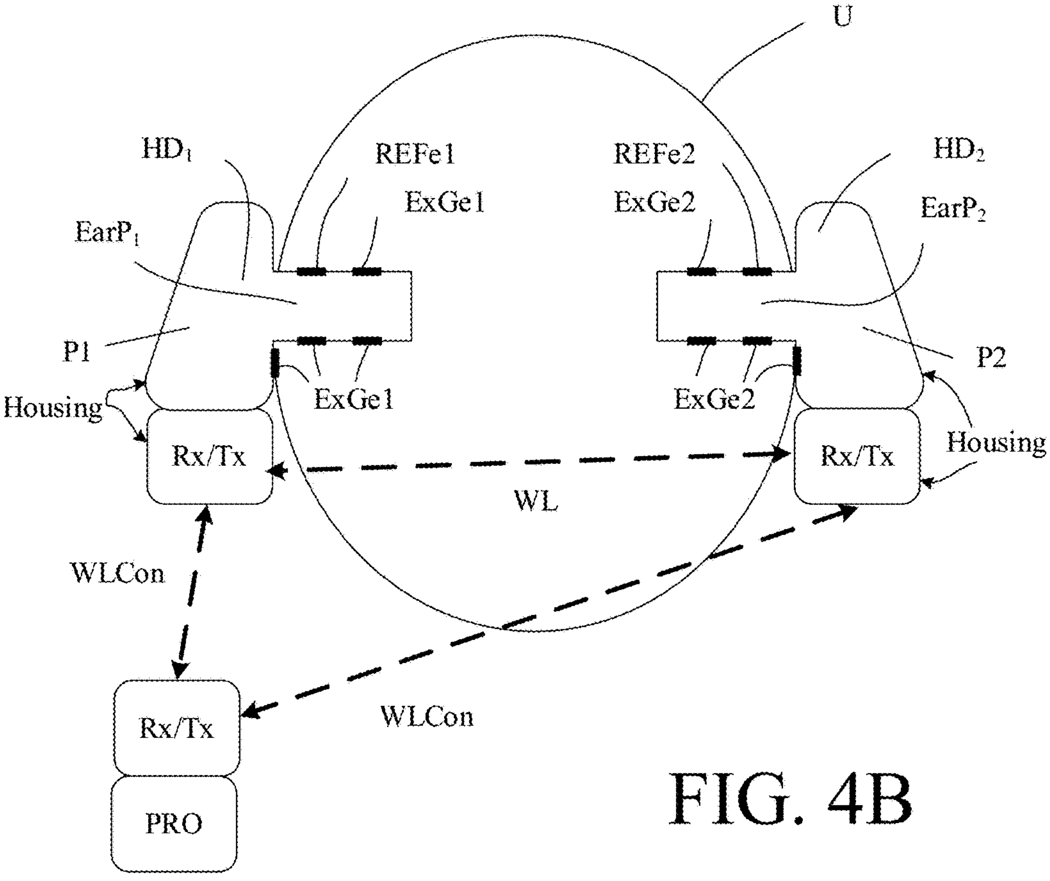
FIG. 4B shows a pair of hearing devices comprising electrodes in an ear canal as well as outside the ear canal of the user, and a wireless interface for communicating with a separate processing part.

FIG. 4B shows a pair of hearing devices (HD1, HD2) of a binaural hearing system comprising electrodes in an ear canal as well as outside the ear canal of the user (U), and a wireless interface (WLCon) for communicating with a separate processing part (PRO, cf. EP3496417A2). In the embodiment of FIG. 4B, the first and second hearing devices ($HD_1$, $HD_2$) comprises first and second parts (P1, P2), respectively, each being located partially in an ear canal and partially outside the ear canal of the user (e.g. in concha or pinna or behind the ear). Further, the first and second hearing devices ($HD_1$, $HD_2$) each comprises EEG- or EOG-electrodes, or a mixture thereof (ExGe1, ExGe2), and a reference electrode (REFe1, REFe2), respectively, arranged on the outer surface (Housing) of the respective earpieces ($EarP_1$, $EarP_2$). Each of the first and second parts (P1, P2) comprises a number of EEG- and/or EOG-electrodes (ExGe1, ExGe2), here four, and a reference electrode (REFe1, REFe2). Thereby a reference voltage ($V_{REF2}$) picked up by the reference electrode (REFe2) of the second part (P2) can be used as a reference voltage for the EEG- or EOG-potentials ($V_{ExG1i}$) picked up by the EEG- or EOG-electrodes (ExGe1) of the first part (P1), and vice versa. In each of the first and second parts (P1, P2) three of the EEG- and/or EOG-electrodes (ExGe1, ExGe2) are shown to be located in the ear canal and one outside the ear canal (but more or less may be present in each location in practice depending on the application). In an embodiment, the first and second hearing devices ($HD_1$, $HD_2$) implements a binaural hearing system, e.g. a binaural hearing aid system. The reference voltages ($V_{REF1}$, $V_{REF2}$) may be transmitted from one part to the other (P1<->P2) via an electric interface (e.g. a wired or wireless connection (here a wireless link (WL) is shown), and optionally to or via auxiliary device (PRO), cf. e.g. wireless links (WLCon) and transceivers (Rx/Tx)). The two sets of EEG-signal voltage differences ($\Delta V_{ExG1}$, $\Delta V_{ExG2}$) can be used separately in each of the respective first and second hearing devices ($HD_1$, $HD_2$) (e.g. to estimate a (further) direction to an interfering signal source (I), and/or to control processing of an input audio signal, or to select one of a multitude of audio sources) or combined in one of the hearing devices and/or in the auxiliary device (PRO, e.g. for display and/or further processing).

The first and second hearing devices ($HD_1$, $HD_2$), e.g. the first and second parts (P1, P2), or e.g. the earpieces ($EarP_1$, $EarP_2$), may each comprise at least one (e.g. two or more) input transducers, e.g. microphones The first and second hearing devices ($HD_1$, $HD_2$), e.g. the first and second parts (P1, P2), or e.g. the earpieces ($EarP_1$, $EarP_2$), may each comprise at least one output transducer providing stimuli to the user in dependence of said noise reduced signal or on a further processed version thereof. The output transducer may comprise a loudspeaker.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Geirnaert et al.; 2021a] Simon Geirnaert, Servaas Vandecappelle, Emina Alickovic, Alain de Cheveigne, Edmund Lalor, Bernd T. Meyer, Sina Miran, Tom Francart, and Alexander Bertrand, "Electroencephalography-based auditory attention decoding: Toward neurosteered hearing devices", IEEE Signal Processing Magazine 38.4 (2021): pp. 89-102.

[Lotte et al.; 2018] Fabien Lotte, Laurent Bougrain, Andrze Cichocki, Mareen Clerc, Marco Congedo, Alain Rakotomamonjy, Florian Yger, "A review of classification algorithms for EEG-based brain-computer interfaces: A 10-year update", Journal of Neural Engineering 13.3 (2018): pp 55.

US2014098981A1 (Oticon) Apr. 10, 2014.

US20170180882A1 (Oticon) Jun. 22, 2017.

European patent application no. 22176296.6 with the title 'A hearing aid system comprising a sound source localization estimator', filed with the European Patent Office on 31 May 2022.

EP3496417A2 (Oticon) Jun. 12, 2019

The invention claimed is:

1. A hearing system comprising:

at least one hearing device adapted to be worn by a user, the hearing system comprising:

at least two input transducers for providing corresponding at least two electric input signals representing sound in an environment around the user;

a beamformer filter connected to said at least two input transducers and configured to provide a spatially filtered signal comprising a target signal from a target sound source in dependence of said at least two electric input signals, adaptively updated beamformer weights, and a target direction relative to the user;

at least one earpiece forming part of said at least one hearing device, each earpiece comprising a housing being adapted to be located at or at least partially in an ear of the user;

a brainwave detection system configured to provide a brainwave-based control signal, the brainwave detection system comprising:

a plurality of brainwave signal sensors located in or on said housing of said at least one earpiece, each sensor providing a brainwave signal representative of said sound in the environment around the user; and electric circuitry connected to said plurality of brainwave signal sensors and configured to receive and process said plurality of brainwave signals, wherein said electric circuitry is configured to identify a further direction to a further sound source, said further direction being different from said target direction, based on one or more of said plurality of brainwave signals, and to provide said brainwave-based control signal indicative thereof, a speech detector for estimating whether or not, or with what probability, an input signal comprises speech at a given point in time and providing a speech activity control signal indicative thereof, a weight estimator configured to estimate said adaptively updated beamformer weights, wherein said adaptively updated beamformer weights represent a beamformer comprising a local minimum in said further direction, where the depth of the local minimum depends on the speech activity control signal; and wherein said hearing system is further configured to determine said spatially filtered signal in dependence of said brainwave-based control signal, said speech activity control signal, and said adaptively updated beamformer weights.

2. A hearing system according to claim 1 wherein the electric circuitry is configured to determine said further direction as a direction of current attention of the user based on one or more of said plurality of brainwave signals.

3. A hearing system according to claim 1 comprising a memory containing reference brainwave data representing brainwave signals recorded while the user is instructed to suppress a distracting sound source on the left or on the right side relative to the user.

4. A hearing system according to claim 3 wherein the electric circuitry is configured to compare the reference brainwave data stored in the memory with current brainwave data representing one or more of said plurality of brainwave signals and to determine said brainwave-based control signal in dependence thereof.

5. A hearing system according to claim 1 wherein the electric circuitry comprises a learning algorithm trained to determine said further direction from said plurality of brainwave signals.

6. A hearing system according to claim 1 wherein the target direction is a look direction of the user.

7. A hearing system according to claim 1 wherein the further direction is in a left or right half plane relative to the user.

8. A hearing system according to claim 1 wherein the at least one earpiece comprises said at least two input transducers.

9. A hearing system according to claim 1 comprising at least one output transducer providing stimuli to the user in dependence of said spatially filtered signal or on a further processed version thereof.

10. A hearing system according to claim 1 comprising an external signal processor separate from and in communication with said at least one earpiece.

11. A hearing system according to claim 1 wherein said brainwave signal sensors are constituted by or comprise electric potential sensors.

12. A hearing system according to claim 1 comprising first and second hearing devices adapted to be worn by a user at or at least partially in left and right ears, respectively, of the user, the first and second hearing devices being configured to exchange data between them.

13. A hearing system according to claim 1 comprising first and second hearing devices adapted to be worn by a user at and at least partially in left and right ears, respectively, of the user, the first and second hearing devices being configured to exchange data between them.

14. Hearing system according to claim 1 wherein the plurality of brainwave signal sensors is located in and on said housing of said at least one earpiece.

15. Hearing system according to claim 1 wherein each earpiece comprises the housing being adapted to be located at and at least partially in an ear of the user.

* * * * *